United States Patent [19]

Cartellone

[11] Patent Number: 5,150,803
[45] Date of Patent: Sep. 29, 1992

[54] DECANTER AND LID ASSEMBLY FOR AUTOMATIC DRIP COFFEE MAKER

[75] Inventor: Mark Cartellone, Rocky River, Ohio

[73] Assignee: Mr. Coffee, Inc., Bedford Heights, Ohio

[21] Appl. No.: 736,062

[22] Filed: Jul. 25, 1991

[51] Int. Cl.$^5$ .................................... B65D 39/10
[52] U.S. Cl. .................................... 215/357; 215/307; 215/319; 215/332; 215/354; 220/254; 220/290; 220/300; 220/301; 220/307; 220/731; 220/86.1; 99/295; 99/306; 126/389; 126/273 R
[58] Field of Search .............. 215/309, 319, 332, 307, 215/310, 320, 353, 354, 356, 357; 220/254, 290, 293, 298, 300, 301, 694, 729, 731, 86.1, 302, 307; 126/273, 389; 99/295, 306

[56] References Cited

U.S. PATENT DOCUMENTS

| | | | |
|---|---|---|---|
| 893,469 | 7/1908 | Essmuller | 215/319 |
| 1,792,356 | 2/1931 | Boiseau | 220/300 X |
| 2,480,578 | 8/1949 | Hodges | 220/300 X |
| 2,621,831 | 12/1952 | Smith . | |
| 3,272,395 | 9/1966 | Lawyer | 220/731 X |
| 3,817,430 | 6/1974 | Borin . | |
| 4,467,707 | 8/1984 | Amiot . | |
| 4,482,083 | 11/1984 | Beck . | |
| 4,583,653 | 4/1986 | Minsky | 220/300 |
| 4,667,587 | 5/1987 | Wunder . | |
| 4,798,222 | 1/1989 | Kauffman . | |
| 4,811,657 | 3/1989 | Rixen . | |
| 4,833,978 | 5/1989 | Martone et al. . | |
| 4,893,552 | 1/1990 | Wunder et al. | 99/299 |
| 4,924,922 | 5/1990 | Johnson . | |
| 4,997,015 | 3/1991 | Johnson | 99/295 X |
| 5,063,837 | 11/1991 | Precht | 99/295 |

FOREIGN PATENT DOCUMENTS

21935 7/1900 Switzerland ............ 220/300

Primary Examiner—Stephen Marcus
Assistant Examiner—Stephen Cronin
Attorney, Agent, or Firm—D. Peter Hochberg; Mark Kusner; Louis J. Weisz

[57] ABSTRACT

A lid assembly for attachment to a decanter for varying the overall height of the decanter comprising a mounting sleeve which is attachable to the open upper end of the decanter and a lid dimensioned to be attached to the mounting sleeve. The sleeve includes an opening extending therethrough communicating with the interior of the decanter, and at least one column of vertically aligned, horizontally oriented slots. Each of the slots has a side communicating with the opening through the sleeve. A recess is formed in the sleeve adjacent the column of slots, the recess being in communication with the opening through the sleeve and communicating with each of the slots. The lid is dimensioned to be telescopically received within the opening in the sleeve and be rotatable within the sleeve. The lid has at least one outwardly extending, generally horizontal lug dimensioned to be movable within the recess in the sleeve and to be movable from the recess into one of the horizontally oriented slots when the lid is rotated.

15 Claims, 7 Drawing Sheets

DECANTER AND LID ASSEMBLY FOR AUTOMATIC DRIP COFFEE MAKER

BACKGROUND OF THE INVENTION

The present invention pertains generally to automatic drip-type coffee makers having anti-drip valve mechanisms, and more particularly to a decanter and lid assembly suitable for use with such automatic drip coffee makers.

FIELD OF INVENTION

Many automatic drip-type coffee makers include an anti-drip valve arrangement located at the outflow opening of the coffee maker's filter/brew funnel. These valve arrangements are provided to prevent coffee from continually flowing or dripping out of the filter/brew funnel when the coffee maker's decanter or carafe is removed therefrom. In this respect, the decanter is typically removed from the coffee maker during the brewing cycle by a user wishing to obtain a cup of coffee without waiting for the brewing cycle of the coffee maker to be completed. In these instances, i.e. when the decanter is removed from the coffee maker during the brewing cycle, the anti-drip valve will close wherein the brewing water builds up within in the filter/brew funnel, and is released when the decanter is returned to the coffee maker.

Most anti-drip valve arrangements associated with automatic drip coffee makers generally operate by means of a spring biassed lever or arm engaging a portion of a lid on the decanter. The lid typically includes a centrally located, opening to direct dripping coffee from the filter/brew funnel into the decanter. The lever or arm of the anti-drip valve arrangement in many instances, engages the upper surface of the lid of the decanter and is deflected upward to open the anti-drip valve when the carafe (with the lid) is positioned below the filter/brew funnel.

As will be appreciated, each manufacturer of an automatic drip coffee maker typically provides a decanter having a specific shape and distinctive design for use with its coffee maker(s). In other words, each coffee maker generally has a unique decanter and lid assembly having a overall height which is operable to engage the anti-drip valve mechanism of that specific coffee maker. As a result, in the event that the decanter is broken, the user is forced to replace the decanter with a like kind (if one is available) to fully utilize the features of the coffee maker.

This problem is overcome by the present invention which provides a lid assembly for a decanter for use with an automatic drip-type coffee maker, which lid assembly is adjustable so as to vary the overall height of the decanter and lid assembly wherein the decanter and lid assembly is suitable for use in many existing automatic drip-type coffee makers and is operable in conjunction with the anti-drip valve mechanisms found thereon.

SUMMARY OF THE INVENTION

In accordance with the present invention there is provided an adjustable lid assembly for attachment to a decanter having an interior cavity and an open upper end. The lid assembly includes a mounting sleeve which is attachable to the open upper end of said decanter. The sleeve has an opening extending therethrough communicating with the interior of the decanter, and at least one column of vertically aligned, horizontally oriented slots, each of which has a side communicating with the opening through the sleeve and an open horizontal end. A generally vertically oriented recess is formed in the sleeve adjacent the column, the recess being in communication with the slots. A lid is provided and dimensioned to be telescopically received within the opening in the sleeve and to be rotatable within the sleeve about a fixed axis. The lid has an upper surface substantially enclosing the open upper end of the decanter, a central aperture through the upper surface which communicates with the interior of the decanter when the lid is within the sleeve, and at least one outwardly extending, generally horizontal lug. The lug is dimensioned to be movable within the recess in the sleeve and to be movable from the recess into one of the horizontally oriented slots when the lid is rotated about the fixed axis.

In accordance with another aspect of the present invention, there is provided a decanter assembly for use in an automatic drip coffee maker. The assembly is comprised of a generally cylindrical decanter having a closed lower end dimensioned to set upon a heating element and an open upper end. A mounting ring dimensioned to be received within the open upper end of the decanter is provided and includes mounting means for mounting the ring to the decanter and an inner surface defining an opening into the decanter, the inner surface having at least one set of vertically arranged, generally identical cavities. A closure member is provided and is dimensioned to be telescopically received with the opening in the mounting ring. The closure member includes a generally closed upper end having a generally planar surface with an aperture formed therein to communicate with the interior of the decanter. The closure member further includes an outwardly extending projection dimensioned to be snugly received within one of the cavities in the mounting such that overall height of the decanter assembly from the closed lower end thereof to the generally planar upper surface of the closure member may be varied by selectively inserting the projection into one of the vertically arranged cavities.

It is an object of the present invention to provide a decanter and lid assembly suitable for use in automatic drip-type coffee makers.

Another object of the present invention is to provide a decanter and lid assembly as described above wherein the overall height of the decanter and lid assembly is variable.

Another object of the present invention is to provide a decanter and lid assembly as described above wherein the lid assembly has an upper surface which may assume variable positions at different elevations relative to the decanter.

Another object of the present invention is to provide a decanter and lid assembly as described above wherein the lid assembly has an upper surface dimensioned to operatively engage the control lever typically found in anti-drip valve arrangements used on automatic drip-type coffee makers.

A still further object of the present invention is to provide a lid assembly for mounting to a decanter for use with an automatic drip-type coffee maker which lid assembly is easily secured to a carafe or decanter and which is adjustable so as to vary the position of the upper surface of the lid assembly relative to the decanter.

A still further object of the present invention is to provide a lid assembly as described above which is simple, economical and easy to use.

These and other objects and advantages will become apparent from the following description of a preferred embodiment of the invention taken together with the accompanying drawings.

BRIEF DESCRIPTION OF THE DRAWINGS

The invention may take physical form in certain parts and arrangement of parts, an embodiment of which is described in detail in the specification and illustrated in the accompanying drawings wherein.

DESCRIPTION OF A PREFERRED EMBODIMENT

Figure 1:
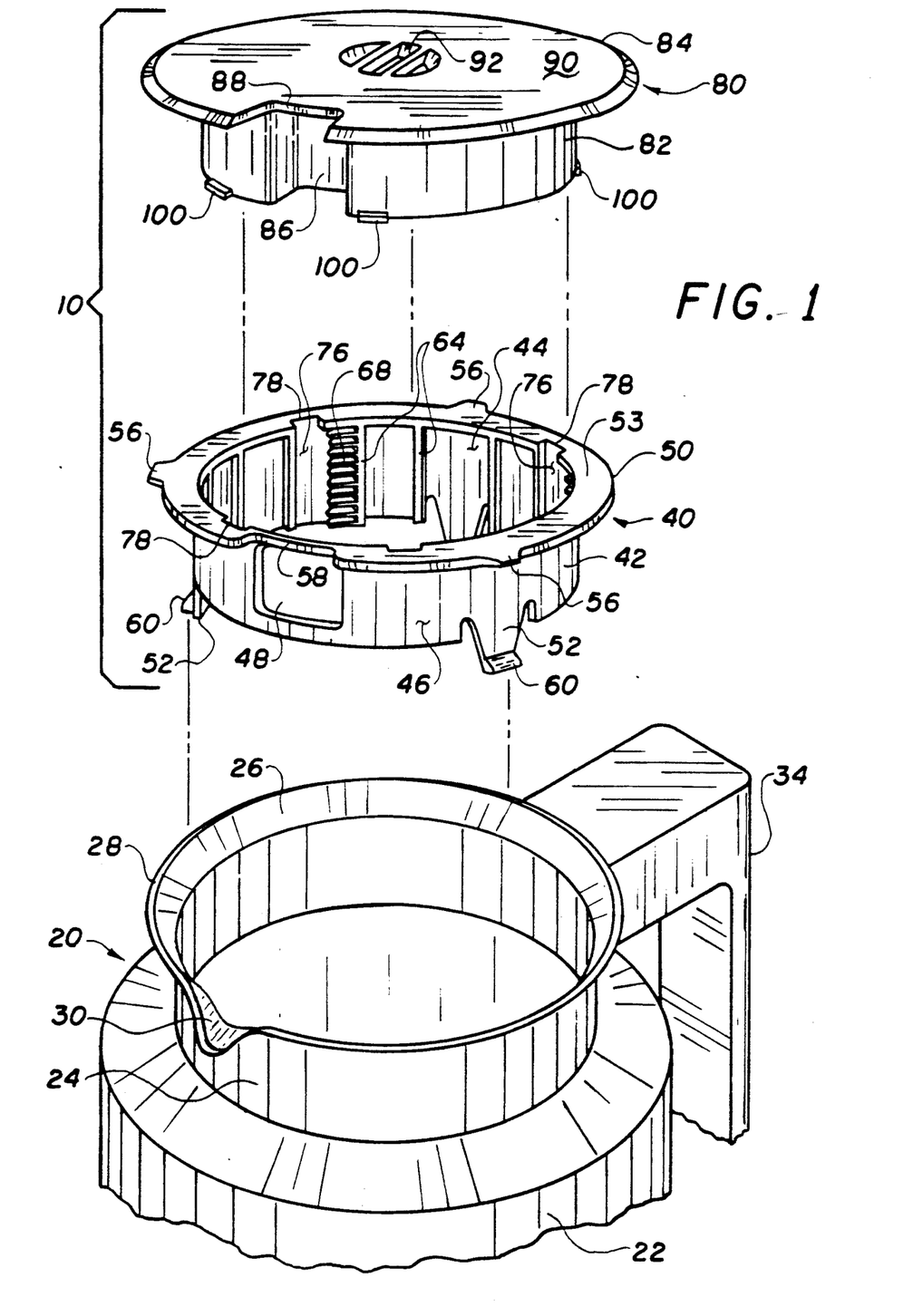
FIG. 1 is an exploded perspective view of a decanter and lid assembly for use with an automatic drip-type coffee maker illustrating a preferred embodiment of the present invention.
Figure 2:
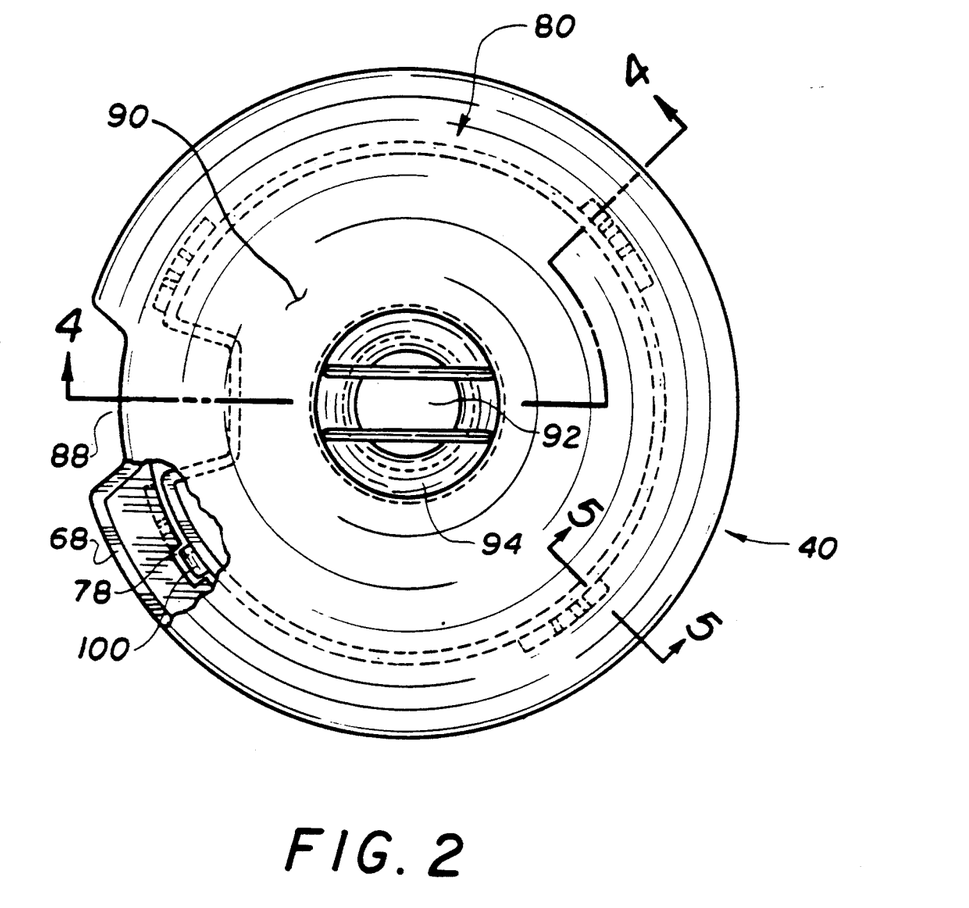
FIG. 2 is a partially-sectioned, top plan view of the lid assembly shown in FIG. 1.

Referring now to the drawings wherein the showings are for the purpose of illustrating a preferred embodiment of the invention, and not for purpose of limiting same, FIG. 1 shows an adjustable lid assembly 10 according to the present invention, for use with a conventional carafe or decanter designated 20 in the drawings.

Decanter 20 is of a type typically used with automatic drip-type coffee makers, and generally includes a large, generally cylindrical, lower body portion 22, a neck portion 24 of reduced diameter and a generally outward flaring, upper lip 26 having a rim 28 formed about the periphery of lip 26. A pouring spout 30 is formed in lip 26 as best seen in FIG. 1. Neck portion 24 defines a generally cylindrical opening into decanter 20 through which brewed coffee may be received and dispensed. A handle 34 is attached to the decanter to facilitate handling thereof.

Lid assembly 10 is generally comprised of a mounting ring 40 adapted to be attached to decanter 20 and a lid 80 dimensioned to be attached to mounting ring 40.

Mounting ring 40 is generally comprised of a cylindrical body portion 42 having an inner surface 44 and an outer surface 46. A generally rectangular opening 48 is formed in body portion 42 as best seen in FIG. 1. Body portion 42 includes a generally circular flange 50 at the upper end thereof and a plurality of generally resilient, downward extending leg portions 52 at the lower end thereof. Flange 50 has a generally planar upper surface 53 and dimensioned to extend inwardly a predetermined distance beyond surface 44 to define an overhang or lip 54 (best seen in FIG. 4) having a circular inner edge. The outer edge of flange 50 is also circular and includes a plurality of outward projecting spacer tabs 56. A recess 58 is formed in flange 50 above rectangular opening 48 in body portion 42. Each leg portion 52 includes an outward extending foot 60. Foot 60 is disposed a predetermined distance from flange 50 to form a locking arrangement dimensioned and operable to secure ring 40 to decanter 20 within neck portion 24, as will be discussed in greater detail below.

Figure 5:
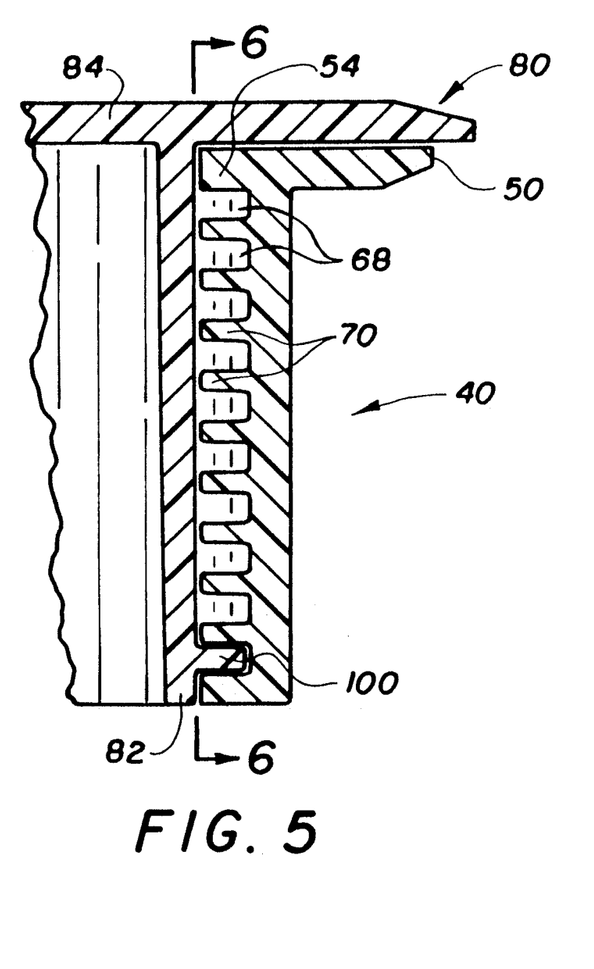
FIG. 5 is an enlarged sectional view taken along line 5-5 of FIG. 2.
Figure 6:
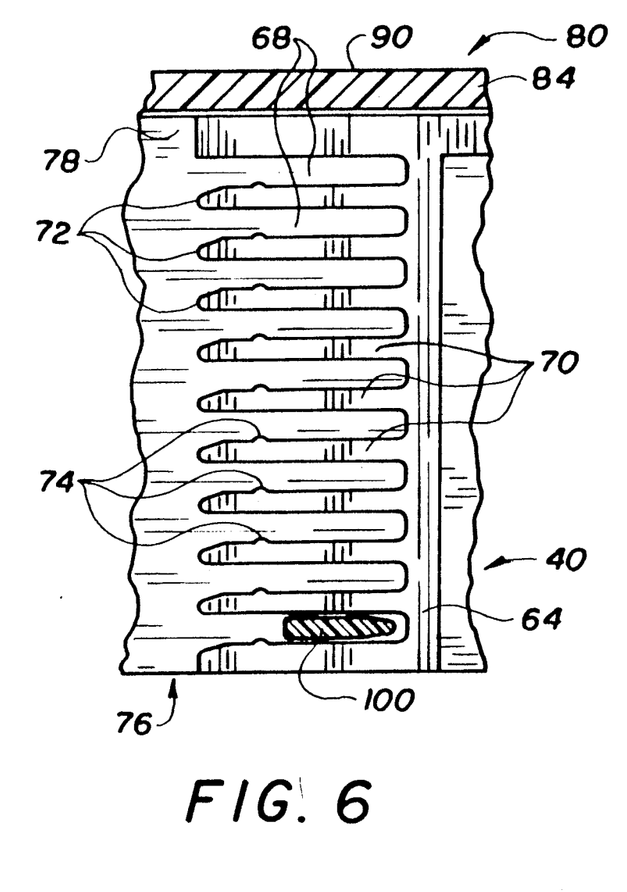
FIG. 6 is a sectional view taken along line 6-6 of FIG. 5.

Body portion 42 includes a plurality of ribs 64 which project inwardly from inner surface 44. Ribs 64 are generally parallel to each other and extend inwardly a distance equal to lip or overhang 54 such that the inner edge of flange 50 and the inner surface of ribs 64 form a common surface, as best illustrated in FIG. 1. Together, the inward facing surfaces of ribs 64 and the inner edge of flange 50 define a generally cylindrical surface through mounting ring 40. Between adjacent ribs 64, a cavity or recess 66 is defined. Within at least one cavity 66 there is provided a set of aligned slots 68 which generally extend through the opening defined in mounting ring 40. As best seen in FIGS. 5 and 6, slots 68 are defined by parallel walls 70 which project from inner surface 44 of cylindrical body portion 42. In the embodiment shown, each wall 70 extends laterally from a rib 64 and terminates in an end 72. Near each end 72, a protuberance 74 is provided on one side of each wall 70. In the embodiment shown, slots 68 are aligned in a straight column and are parallel to each other. The column of slots 68 is oriented in a direction parallel to the axis of the cylindrical opening through mounting ring 40. Adjacent each set or column of slots 68, a passage 76 is defined. Passage 76 is disposed adjacent the column of slots 68 and is aligned with a notch 78 (best illustrated in FIG. 1) formed within lip 54 of flange 44.

Figure 3:
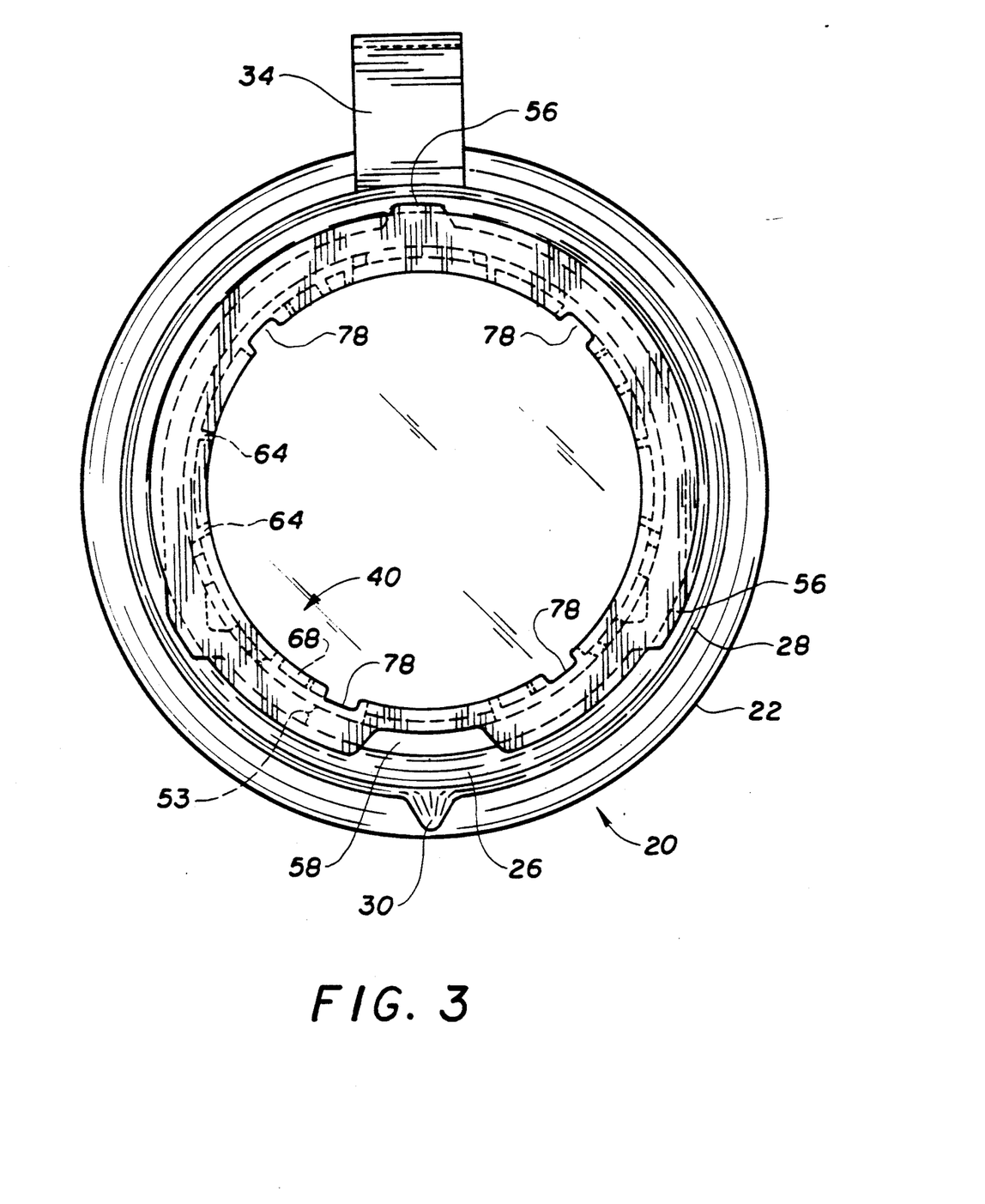
FIG. 3 is an enlarged plan view of a mounting ring according to the present invention shown within a decanter.
Figure 4:
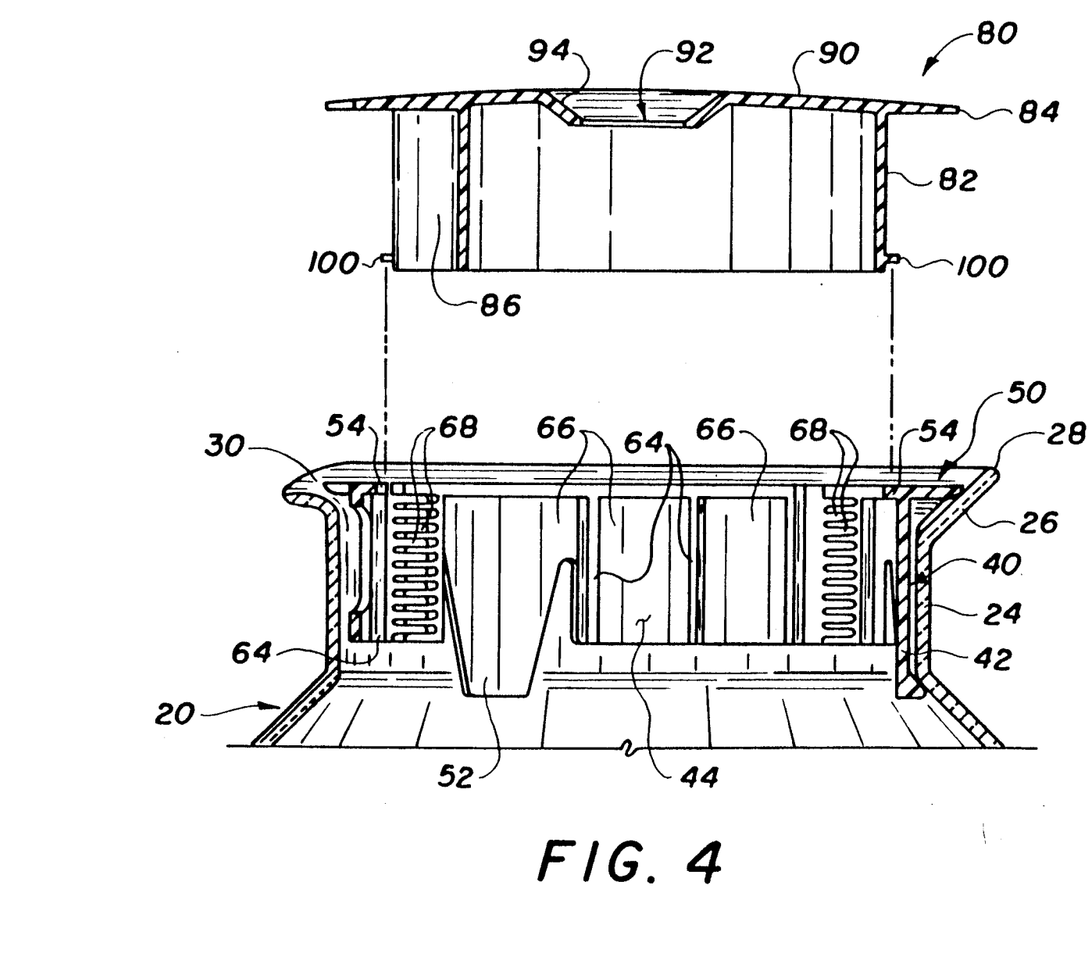
FIG. 4 is a sectional view taken along line 4-4 of FIG. 2 showing a mounting ring according to the present invention positioned within the decanter and a lid spaced therefrom.

In the embodiment shown, mounting ring 40 is dimensioned to be received within carafe 20 as best illustrated in FIG. 4. In this respect, flange 50 and feet 60 on leg portions 52 are dimensioned such that mounting ring 40 snap locks into engagement within neck portion 24 of carafe 20. Importantly, mounting ring 40 is dimensioned such that flange 50 is disposed below rim 28 of carafe 20 as shown in FIG. 4. Tabs 56 maintain the outer edge of flange spaced apart from lip 26 of decanter 20 as best illustrated in FIG. 3, such that an annular space or opening is defined between outer edge of flange 50 and lip 26 of carafe 20.

Lid 80 is generally comprised of a body portion 82 and a cap portion 84. Body portion 82 is generally cylindrical in shape and includes a channel 86 formed along one side thereof. Cap portion 84 is circular in shape and has a diameter greater than the diameter of body portion 82 wherein cap portion 84 extends a predetermined distance beyond body portion 82 as shown in the drawings. Cap portion 84 is preferably dimensioned to have an outer diameter which is slightly less than the diameter of lip 26 of decanter 20. Cap portion 84 includes a recess 88 formed therein which is aligned with channel 86 in body portion 82. Cap portion 84 has an upper surface 90 which is preferably crowned or dishshaped and slopes to the side (as best seen in FIG. 4). An aperture 92 is centrally located through cap portion 84.

Aperture 92 is defined by a downwardly and inwardly sloping conical surface 94 best illustrated in FIG. 4.

A plurality of locking tabs 100 are provided at the lower end of body portion 82 of lid 80. Tabs 100 extend laterally outward from body portion 82 and are disposed so as to register with notches 78 formed in mounting ring 40. In this respect, according to the present invention, body portion 82 of lid 80 is dimensioned to be telescopically received within the cylindrical opening defined by mounting ring 40 (i.e. the cylindrical opening defined by the inner surfaces of ribs 64 and walls 70) wherein tabs 100 are movable through passages 76. Tabs 100 are dimensioned to be received within slots 68 as illustrated in FIG. 6.

According to the present invention, mounting ring 40 and lid 80 are preferably formed by molding a rigid thermoplastic material such as polycarbonate, polystyrene, polyvinylchloride or other similar plastic material.

In operation, mounting ring 40 is fastened to decanter 20 with flange 50 and leg portions 52 gripping the wall surfaces on opposite sides of neck portion 24 of decanter 20 as illustrated in FIG. 4. As indicated above, mounting ring 40 is preferably dimensioned such that flange 50 is positioned below the upper edge of lip 26. Lid 80 is inserted into mounting ring 40 with tabs 100 being received in passages 76 therein. As will be appreciated, the overall height of the decanter, i.e. the height from the base of the decanter to upper surface 90 of lid 80, is adjustable depending upon the specific slot 68 in which tabs 100 are positioned. The position of lid 80 can be selectively adjusted such that upper surface 90 of lid 80 will properly engage the anti-drip valve assembly of a given coffee maker. In this respect, lid 80 is locked into position on mounting ring 40 by guiding tabs 100 into passages 76 of mounting ring 40, and then angularly rotating lid 80 relative to mounting ring 40 such that tabs 100 snap lock over proturberances 74 on walls 70 into stationery positions within slots 68, as illustrated in FIG. 6.

Figure 7:
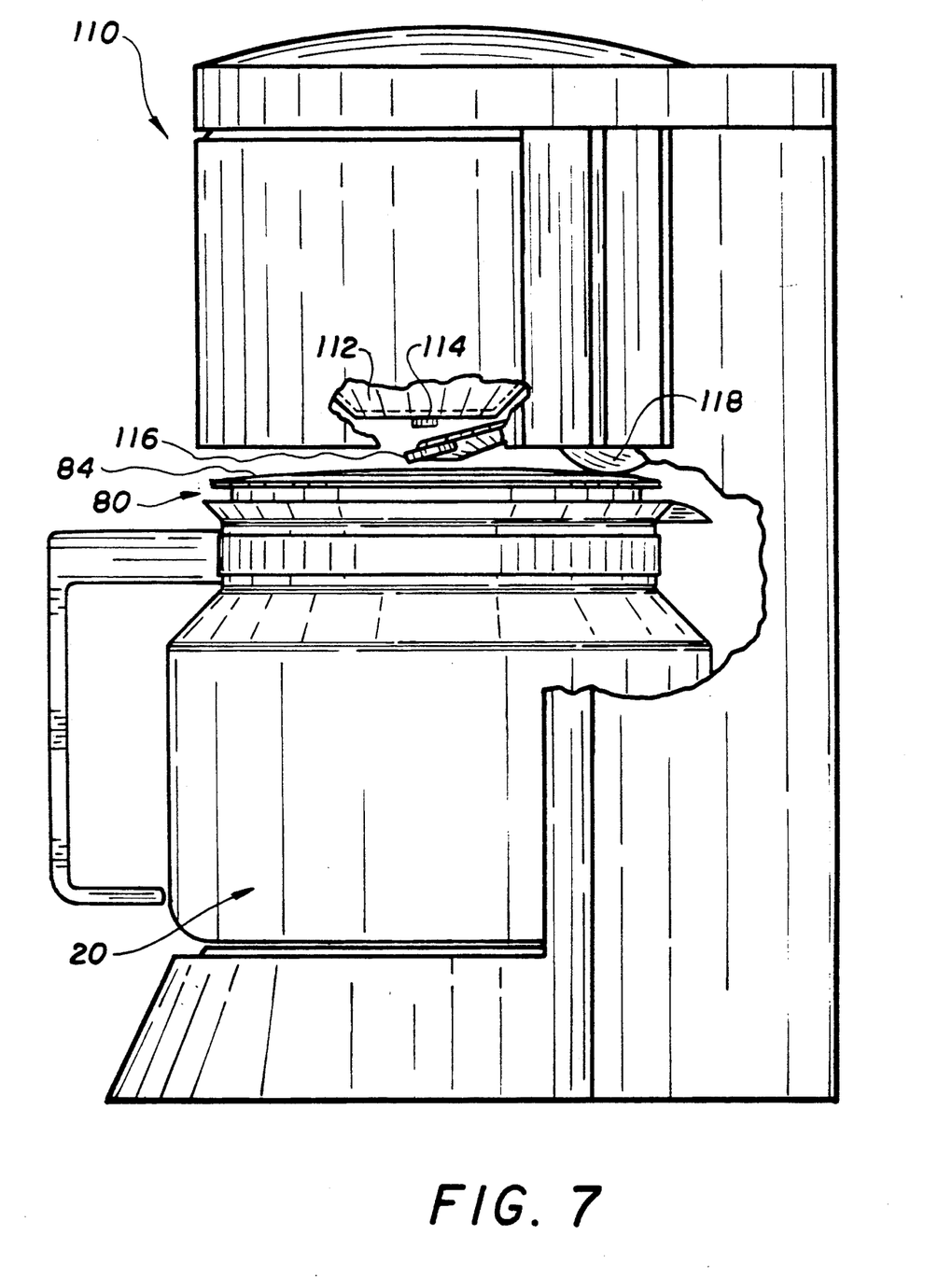
FIG. 7 is a view of a decanter and lid assembly according to the present invention positioned within a drip-type coffee maker having an anti-drip valve mechanism, illustrating how a lid assembly according to the present invention may be adjusted to operatively engage the anti-drip valve mechanism.

FIG. 7 illustrates a typical application of the present invention and shows a conventional automatic drip-type coffee maker 110 having a brew funnel or basket 112 having a drain port 114 and an anti-drip valve mechanism 116 associated therewith. Such mechanisms typically include a lever arm 118 operable to engage the upper surface of a decanter lid wherein the anti-drip valve is moved to an open position to permit coffee within the brew funnel or basket to drain into the decanter. As indicated above, most manufacturers of anti-drip coffee makers design specific decanters and lid assemblies to operate with a specific valve mechanism of the given coffee maker. The present invention enables a standard carafe and lid assembly to be adjusted to operate with most existing anti-drip coffee makers. In this respect, as will be appreciated with the present invention, the overall height of a carafe, i.e. the decanter and the lid assembly can be adjusted by selectively positioning lid 80 within mounting ring 40. With lid 80 positioned at the proper height to engage the anti-drip mechanism of a coffee maker, the carafe and lid assembly are positioned within the coffee maker such that aperture 92 in lid 80 is aligned with drain port 114 of the brew basket 112. Importantly, the design of lid assembly 10 permits slight misalignment of aperture 92 with respect to drain port 114. In this respect, any coffee spilled upon surface 90 of lid 80 will flow to the edges of cap portion 84 as a result of the slight crown therein. Because cap portion 84 has a diameter smaller than the outer diameter of lip 26 of decanter 20, coffee will overflow cap portion 84 and be returned to decanter 20 by flowing down lip 26. In this respect, the annular space between lip 26 and outer edge of flange 50 which is created by tabs 56 ensures free access of the flowing coffee to the interior of the decanter.

Figure 8:
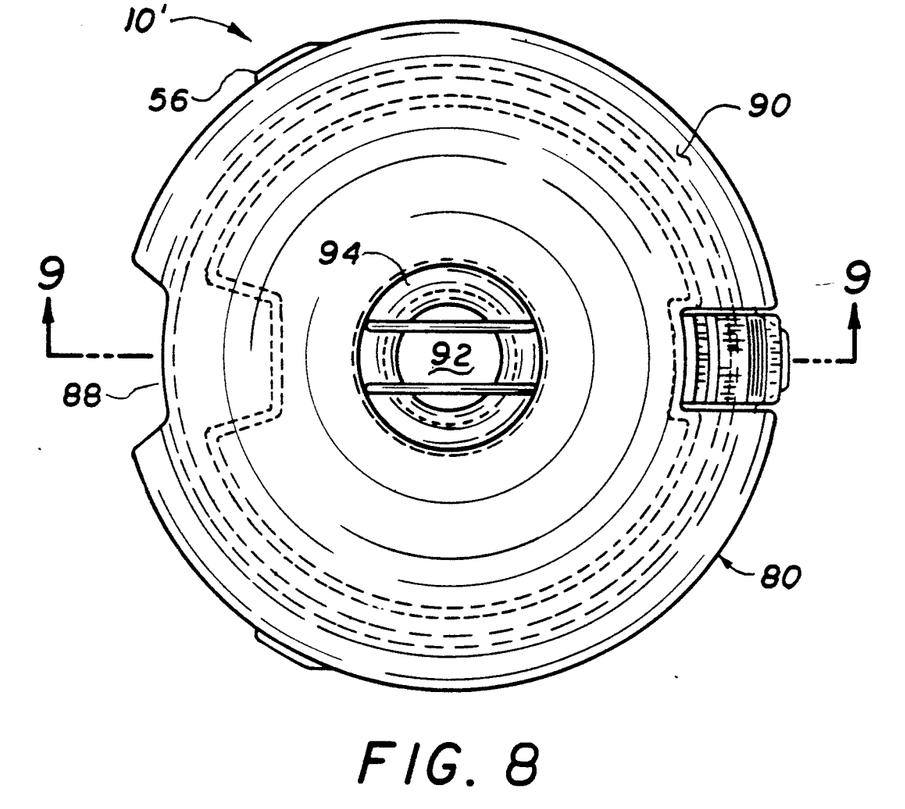
FIG. 8 is a top plan view of a lid assembly illustrating another embodiment of the present invention.
Figure 9:
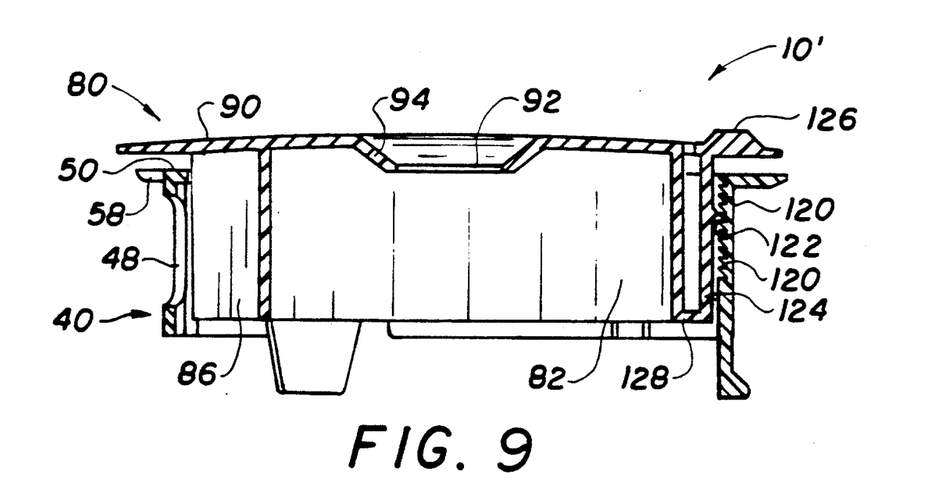
FIG. 9 is a sectional view taken along line 9-9 of FIG. 8.

Referring now to FIGS. 8 and 9, an adjustable lid assembly 10′ illustrating another embodiment of the present invention is shown. Lid assembly 10′ is similar in most respects to the embodiment shown in FIGS. 1-6, and therefore like components are generally designated with the same reference numbers set forth in FIGS. 1-6, and will not be described in great detail. In this respect, lid assembly 10′ is comprised of a mounting ring 40 and a lid 80. Lid 80 includes a body portion 82 dimensioned to be slidably received within the opening defined by ring 40. In the embodiment shown in FIGS. 8 and 9, mounting ring 40 includes a plurality of wedge-shaped, generally horizontal cavities 120 aligned one above another. Cavities 120 are dimensioned to receive a wedge-shaped tab 122 formed on lid 80. Tab 122 is formed as part of resilient arm 124 attached to lid 80. Arm 124 includes a finger pad 126 at the upper end thereof and is attached to lid 80 by a hinge portion 128 at the lower end of arm 124. Arm 124 is preferably molded with lid 80 to form a "living hinge" wherein arm 124 is resilient and biased outward such that tab 122 may be disposed within one of cavities 120. In this respect, by selectively positioning tab 122 within a specific cavity 120, the overall height of a decanter having lid assembly 10′ attached thereto may be varied. Release of tab 122 from cavity 120, to reposition lid 80 with respect to mounting ring 40 may be accomplished by using finger pad 126 to force arm 124 upwardly away from ring 40 and cavities 120.

The present invention thus provides a carafe and lid assembly wherein the overall height of the carafe is adjustable so as to provide a replacement carafe and lid assembly suitable for use with the anti-drip valve mechanism of most automatic drip-type coffee makers. Modifications and alterations to the lid assembly heretofore described will occur to others upon a reading and understanding of the present application. It is intended that any and all modifications and alterations to the present invention be included insofar as they come with the scope of the patent as claimed by the equivalents thereof.

Having described the invention, the following is claimed:

1. An adjustable lid assembly for attachment to a decanter having an interior cavity and an open upper end, comprising:
   a mounting sleeve which is attachable to the open upper end of the decanter, said sleeve having
   an opening extending therethrough for communicating with the interior of the decanter, and
   at least one column of vertically aligned, horizontally oriented slots, each of said slots having a side communicating with said opening through said sleeve, and
   a generally vertically oriented recess formed in said sleeve adjacent said column, said recess being in communication with said opening through said sleeve and communicating with said slots, and
   a lid dimensioned to be telescopically received within said opening in said sleeve and to be rotatable within said sleeve about a fixed axis, said lid having an upper surface for substantially enclosing the open upper end of the decanter, a central aperture through said upper surface which communicates with the interior of the decanter when said lid is within said sleeve, and at least one outwardly extending, generally horizontal lug dimensioned to be movable within said recess in said sleeve and to be movable from said recess into one of said horizontally oriented slots when said lid is rotated about said axis.

2. An adjustable lid assembly as defined in claim 1 wherein said mounting sleeve includes resilient leg portions operable to engage the inner surfaces of the decanter.

3. An adjustable lid assembly as defined in claims 1 or 2 wherein said mounting ring is dimensioned to be positioned below the upper end of the decanter.

4. An adjustable lid assembly as defined in claim 3 wherein said mounting sleeve and said lid are of molded plastic construction.

5. An adjustable lid assembly as defined in claim 1 wherein said mounting ring is generally cylindrical in shape and has a generally cylindrical opening therethrough.

6. A lid assembly for attachment to a decanter having an interior cavity and an open upper end, comprising:

a mounting ring for attachment to the open upper end of the decanter including a wall member dimensioned to be received within the open upper end of the decanter, said wall member defining a generally cylindrical opening which is symmetrical about an axis, said opening for communicating with the interior cavity of the decanter, mounting means for mounting said ring to the decanter, a column of vertically aligned, horizontally oriented slots, said column being generally parallel to the axis of said cylindrical opening and being formed in the surface of said wall member defining said cylindrical opening wherein one side of said slots communicate with said opening, recess means formed adjacent said column wherein one horizontal end of each slot communicates with said recess, and a closure member including:

a generally cylindrical body portion having an open bottom end and generally closed upper end, said body portion dimensioned to be received within said cylindrical opening within said mounting ring and to be rotatable about said axis and a lug extending outwardly from said cylindrical body portion dimensioned to be movable within said recess means and movable from said recess means into a slot in said columns.

7. A lid assembly as defined in claim 6 wherein said mounting means is comprised of a flange at the upper end of said wall member and a plurality of resilient leg portions at the lower end of said wall member, said flange and said leg portions dimensioned for engaging the inner surface of the decanter.

8. A lid assembly as defined in claim 6 wherein said mounting ring includes a plurality of said columns of slots.

9. A lid assembly as defined in claim 6 wherein said mounting ring and said lid are of molded plastic construction.

10. A decanter assembly for use in an automatic drip coffee maker comprising:

a generally cylindrical decanter having a closed lower end dimensioned to set upon a heating element and an open upper end, a mounting ring dimensioned to be received within said open upper end of said decanter, said ring including mounting means for mounting said ring to said decanter and an inner surface defining an opening into said decanter, said inner surface having at least one column of generally vertically aligned, horizontally oriented slots, and a closure member dimensioned to be telescopically received with said opening in said mounting ring, said closure member including a generally closed upper end having a generally planar upper surface with an aperture formed therein to communicate with the interior of said decanter, said closure member including an outwardly extending projection dimensioned to be snugly received within one of said slots, wherein the overall height of said decanter assembly from said closed lower end of said decanter to said generally planar upper surface of said closure member may be varied by selectively inserting said projection into one of said horizontally oriented slots.

11. A decanter assembly as described in claim 10 wherein said projection is dimensioned to snap-lock into engagement with said one of said slots.

12. A decanter assembly as described in claim 11 wherein said projection is snap-locked into said slot by rotation of said lid closure about a generally vertical axis.

13. An adjustable lid assembly for attachment to a decanter, comprising:

a mounting ring dimensioned to be received within the open upper end of the decanter, said ring including mounting means for mounting said ring to the decanter and an inner surface defining an opening into the decanter, said inner surface having at least one column of generally vertically aligned, horizontally oriented slots, and a closure member dimensioned to be telescopically received with said opening in said mounting ring, said closure member including a generally closed upper end having a generally planar upper surface with an aperture formed therein to communicate with the interior of the decanter, said closure member including an outwardly extending projection dimensioned to be snugly received within one of said slots wherein the overall height of the decanter and lid assembly from the lower end of the decanter to said generally planar upper surface of said closure member may be varied by selectively inserting said projection into one of said horizontally oriented slots.

14. An adjustable lid assembly as described in claim 13 wherein said projection is dimensioned to snap-lock into engagement with said one of said slots.

15. An adjustable lid assembly as described in claim 13 wherein said projection is snap-locked into said cavity by rotation of said lid closure about a generally vertical axis.

* * * * *